United States Patent [19]

Buchanan

[11] Patent Number: 5,056,160

[45] Date of Patent: Oct. 15, 1991

[54] RAIN COAT FOR HORSE AND RIDER

[76] Inventor: Roger T. Buchanan, 908 South Mud Springs Rd., Payson, Ariz. 85541

[21] Appl. No.: 497,486

[22] Filed: Mar. 22, 1990

[51] Int. Cl.$^5$ .............................................. A41D 3/08
[52] U.S. Cl. ................................................. 2/88; 2/87
[58] Field of Search ...................... 2/85, 87, 88, 93, 94, 2/247

[56] References Cited

U.S. PATENT DOCUMENTS

| | | | |
|---|---|---|---|
| 1,270,704 | 6/1918 | Creery | 2/88 |
| 3,026,527 | 3/1962 | Polk | 2/247 |
| 4,151,616 | 5/1979 | Larsen | 2/88 |

FOREIGN PATENT DOCUMENTS

| | | | |
|---|---|---|---|
| 84839 | 6/1895 | Fed. Rep. of Germany | 2/87 |
| 125901 | 7/1931 | Fed. Rep. of Germany | 2/88 |
| 131746 | 2/1933 | Fed. Rep. of Germany | 2/88 |
| 718048 | 1/1932 | France | 2/88 |
| 914986 | 10/1946 | France | 2/87 |
| 1239304 | 7/1960 | France | 2/88 |
| 1306717 | 9/1962 | France | 2/88 |
| 232165 | 3/1969 | U.S.S.R. | 2/88 |
| 21437 | 5/1896 | United Kingdom | 2/87 |

Primary Examiner—Andrew M. Falik
Assistant Examiner—Diana L. Biefeld
Attorney, Agent, or Firm—Don J. Flickinger; Jordan M. Meschkow

[57] ABSTRACT

A rain coat for protecting a horseback rider and the associated riding equipment from the rain consists of a cloak having a length and width sufficient to cover the full body of a seated rider as well as a portion of a horse's body extending from approximately the front shoulders to about halfway down the animal's buttocks. A vent is formed in the lower front portion of the cloak for allowing the rider to conveniently grasp the horse's reins.

14 Claims, 2 Drawing Sheets

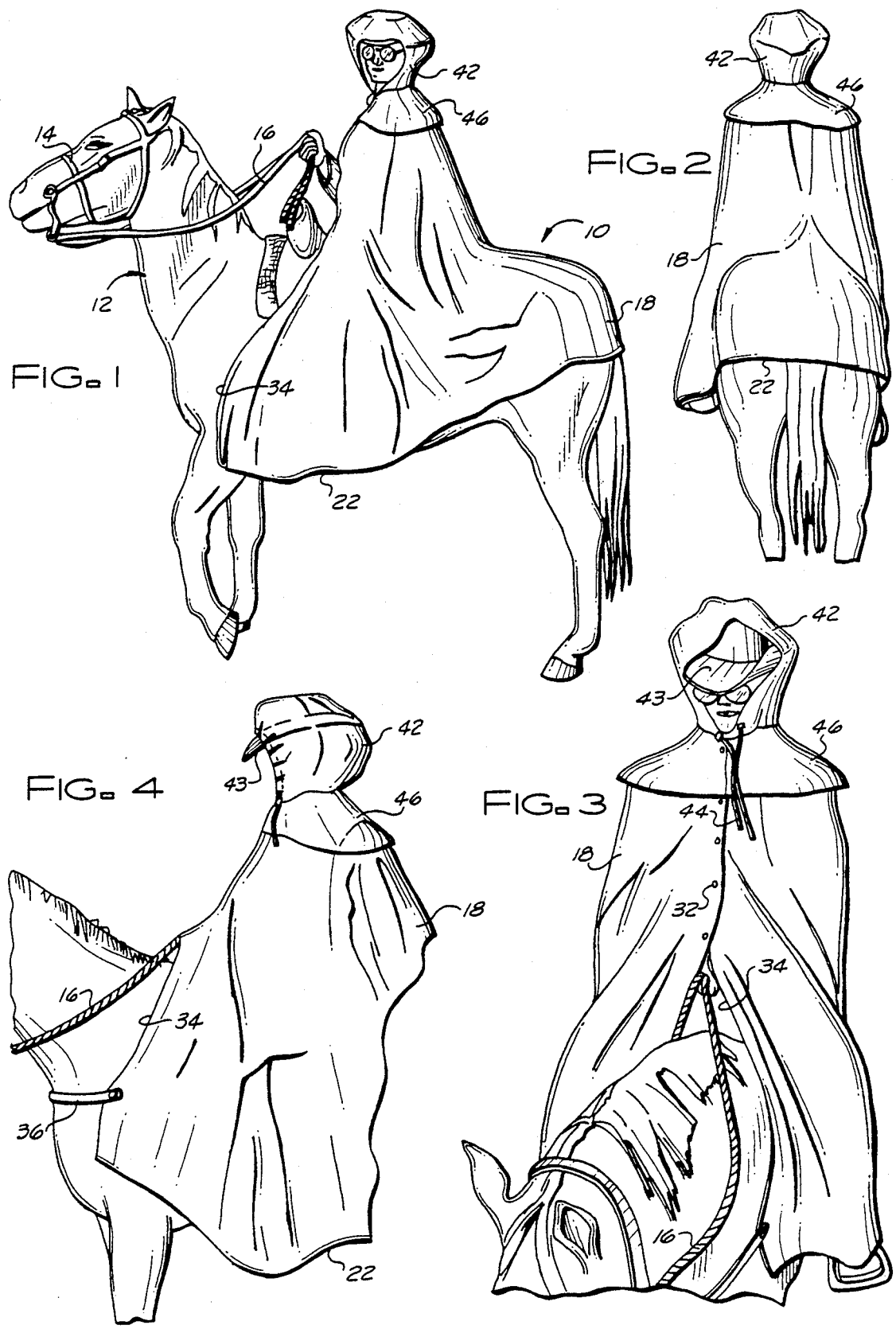

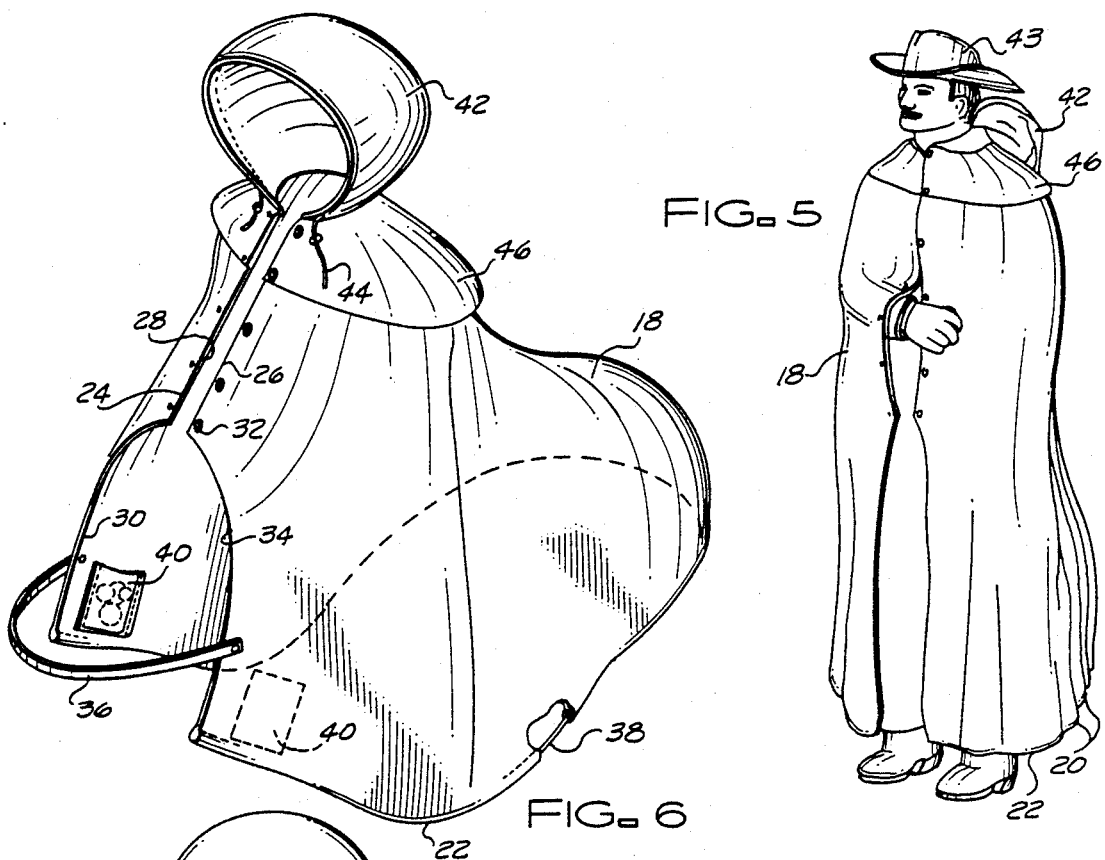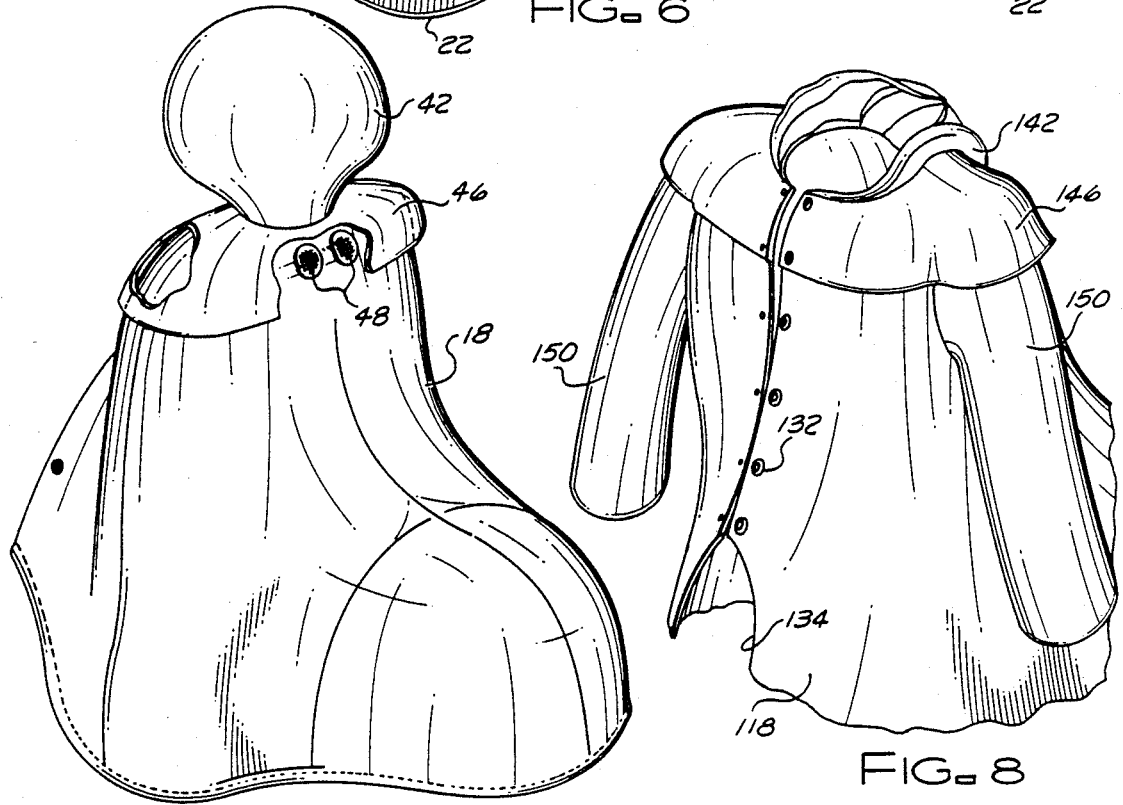

RAIN COAT FOR HORSE AND RIDER

BACKGROUND

1. Field of the Invention

This invention relates to the art of clothing.

More particularly, this invention relates to a rain coat.

In a further and more specific aspect, the instant invention concerns an equestrian rain coat, which protects a horse's saddle and stirrups as well as the rider.

2. Description of the Prior Art

Ardent horsemen enjoy riding in any sort of weather. Many find the discomforts of rain, wind and cold to be minor in comparison to the pleasure of riding a horse. For such hearty individuals, a conventional rain coat or poncho has been considered sufficient protection from the elements.

Unfortunately, however, physical discomfort is not the only rider's only concern when he or she ventures out in inclement weather. Consideration must also be given to the effect this will have on equipment such as the rider's boots or the horse's saddle, stirrups and reins. Such equipment is usually made of leather, which deteriorates when wet. Deterioration of the riding equipment is undesirable, since it is generally very expensive to replace.

Until the present, no garment has been designed which satisfactorily protects both a horseback rider and his equipment from the rain. The closest known prior art relates to rain coats for protecting cyclists and the body portions of their bikes. However, since the overall configuration of a bicycle or motorcycle is entirely different from that of a horse, these garments would not be suitable for equestrian use.

It would be highly advantageous, therefore, to remedy the foregoing and other deficiencies inherent in the prior art.

Accordingly, it is an object of the present invention to provide a rain coat for protecting both a horseback rider and his riding equipment.

Another object of the invention is the provision of a rain garment of a suitable length for a rider when the rider is seated on a horse as well a when the rider is standing dismounted from the horse.

And another object of the invention is to provide an equestrian rain coat which will not bunch up behind the saddle when the horse and rider are in motion.

Still another object of the invention is the provision of an equestrian rain coat which will not be blown away from the saddle and stirrups during heavy winds.

Yet another object of the invention is to provide an equestrian rain coat with breather holes for allowing air to circulate in and out of the coat.

Yet still another object of the invention is the provision of an equestrian rain coat which allows ample room for a rider to manipulate a horse's reins.

And a further object of the invention is to provide an equestrian rain coat which is lightweight, compact and comfortable to wear.

And still a further object of the invention is the provision of an equestrian rain coat with an adjustable hood which can be worn over a bare head or a cowboy hat.

And yet a further object of the invention is the provision of an equestrian rain coat, according to the foregoing, which is relatively inexpensive to manufacture.

SUMMARY OF THE INVENTION

Briefly, to achieve the desired objects of the instant invention in accordance with the preferred embodiment thereof, a rain coat is provided for protecting a horseback rider and the associated riding equipment from the rain. The rain coat consists of a cloak having a length and width sufficient to cover the full body of a seated rider as well as a portion of a horse's body extending from approximately the front shoulders to about halfway down the animal's buttocks. A vent is formed in the lower front portion of the cloak for allowing the rider to conveniently grasp the horse's reins. A removable strap may be extended across the vent to fasten the cloak across the horse's throat for better protection in high winds. Further protection against the wind may be provided by weights contained in interior pockets or inside the hem of the cloak. A hood is also provided for protecting the rider's head.

In one embodiment of the invention, no armholes are provided. In a second embodiment, the cloak includes sleeves.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a side view showing a horse and rider covered by a rain coat according to the present invention.

FIG. 2 is a rear view showing the horse and rider of FIG. 1.

FIG. 3 is a fragmentary perspective view showing the horse and rider as viewed from the front.

FIG. 4 is a fragmentary side view showing the horse and rider in the rain coat with optional throat strap attached FIG. 5 is a perspective view showing a standing, dismounted rider in the rain coat according to the present invention.

FIG. 6 is a perspective view, taken from the front and side, of the rain coat of the present invention, with a portion of the hem broken away to reveal its inner structure.

FIG. 7 is a perspective view, taken from the rear and side, of the rain coat according to the present invention, with portions broken away to shown inner structure.

FIG. 8 is a perspective view showing an alternate embodiment of the invention.

DETAILED DESCRIPTION OF THE PREFERRED EMBODIMENT

Turning now to the drawings in which like reference characters indicate corresponding elements throughout the several views, attention is first directed to FIG. 1, which shows a rider wearing a rain coat according to the present invention, indicated in its entirety by the numeral 10. The rider is seated upon an average-sized horse 12 equipped with a bridle 14 and reins 16. Although obstructed from view by the rain coat 10, it should be understood that other standard equipment such as a saddle and stirrups are also provided.

The rain coat 10 comprises a loosely fitting weatherproof cloak 18 which is draped over the rider's shoulders, and entirely covers the seated rider's body and legs as well as a portion of the horse's body from approximately the front shoulders to around the center of the buttocks, as seen in FIGS. 1 and 2. When the rider dismounts and stands, as shown in FIG. 5, the cloak 18 falls in pleats 20 around the rider's body, but the bottom edge 22 of the cloak remains above the tops of the rider's feet. Experience has shown the illustrated length to be optimum, since a cloak of shorter length tends to ride up over the horse's rump and become bunched behind the saddle, while a longer cloak drags along the ground when the rider dismounts and restricts the mobility of both horse and rider when the rider is seated.

As best shown in FIG. 6, the cloak 18 includes a pair of opposed front edges 24, 26, each of which includes an upper portion 28 and a lower portion 30. The upper portions 28 of the front edges 24, 26 are substantially parallel to one another, while the lower portions 30 are divergent. Fastening means such as buttons or snaps 32 are provided for securing the upper portions 28 of the front edges 24, 26 to one another across the rider's chest.

The divergent lower portions 30 define a vent 34 which extends along both sides of the horse's neck when the rider is seated. The top of the vent 34 is located slightly above the pommel of the saddle to allow the rider to freely manipulate the horse's reins 16. The rider may extend his arms through the vent 34 to hold the reins outside of the cloak 18, as shown in FIG. 1, or he may draw the reins into the cloak for greater protection, as shown in FIGS. 3 and 4.

On particularly windy days, the front edges of the cloak may be blown back, exposing the rider's legs and stirrups. To prevent this from happening, the detachable strap 36 shown in FIGS. 4 and 6 may be fastened across the horse's throat. On calmer days, the strap 36 is preferably removed as shown in FIG. 1 to allow the rider greater mobility.

Further resistance to the wind may be obtained by stitching a weighted flexible cable 38 into the hem of the cloak 18, as shown in FIG. 6. In addition, a plurality of open pockets 40 may be formed on the inside surface of the cloak near the bottom edge. These pockets 40 may be filled with stones or other removable weights to keep the cloak down during heavy wind storms, or they may simply be used to store some of the rider's possessions.

A hood 42 is secured to the top edge of cloak 18 for protecting the rider's head from the elements. The hood 42 is spacious enough to accommodate a 10-gallon hat 43 on the head of the rider, as shown in FIGS. 1-5. However, a drawstring 44 is provided to allow adjustment of the hood 42 to fit closely over a bare-headed rider as well.

Depending from the base of the hood 42 is a cape or shoulder flap 46 which extends around the rider's shoulders. A pair of breather holes 48 is formed in a portion of the cloak 18 underlying the flap 46, as shown in FIG. 7. The purpose of the breather holes 48 is to enable fresh air to circulate in and out of the cloak 18, while the purpose of the flap 46 is to prevent rain water and the like from entering the breather holes. The flap 46 serves a decorative function as well.

Because the spaciousness of the cloak 18 is sufficient to allow fairly free movement of the rider's arms, no armholes have been provided in the embodiment of the invention shown in FIGS. 1-7. This embodiment can be manufactured at minimal cost. However, some riders may find a second embodiment of the invention, illustrated in FIG. 8, more comfortable or suitable to their aesthetic tastes. The embodiment of FIG. 8, which includes cloak 118, fasteners 132, vent 134, hood 142 and cape or shoulder flap 146, is substantially identical to that of FIGS. 1-7, except that a pair of full-length sleeves 150 have been added. The sleeves 150 enable the rider to extend his arms fully in any direction and thus may be desirable to riders who require unrestricted mobility.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. A rain coat to b worn by a rider of a horse equipped with a saddle, stirrups and reins, said rain coat comprising:
   (a) a weatherproof cloak for draping over said individual's shoulders and encircling said rider's upper body, the contour and dimensions of said cloak being selected so that said cloak loosely covers said saddle, said stirrups and approximately one half of said horse's buttocks when said rider is seated on said horse, and the length of said cloak not exceeding the distance from said rider's feet to said rider's shoulders when said rider is in a standing position dismounted from said horse;
   (b) a vent formed in the front of said cloak for allowing said rider to grasp said reins, said vent extending from the bottom edge of said cloak to above the pommel of said saddle when said rider is seated on said horse;
   (c) a front opening extending from the top of said vent to the top edge of said clock;
   (d) first fastening means for selectively closing said front opening;
   (e) second fastening means extending across said vent for securing said cloak about the throat of said horse; and
   (f) a weatherproof hood secured to the top of said cloak for covering the head of said rider.

2. The rain coat according to claim 1, further comprising:
   (a) a hem formed along the bottom edge of said cloak; and
   (b) means encased within said hem for weighting the bottom edge of said cloak.

3. The rain coat according to claim 1, further comprising
   (a) open pocket means formed inside said cloak proximate the bottom edge thereof; and
   (b) means removably contained within said pocket means for weighting the bottom edge of said cloak.

4. The rain coat according to claim 1, wherein said hood comprises:
   (a) a bonnet contoured and dimensioned to fit over a wide-brimmed hat; and
   (b) adjustment means for tightening said bonnet about said rider's face.

5. The rain coat according to claim 4, wherein said adjustment means comprises a drawstring.

6. The rain coat according to claim 1, further comprising:

(a) at least one breather hole formed in said cloak for allowing air to circulate in and out of said cloak; and (b) flap means depending from said hood and overlying said breather hole for preventing water from entering through said breather hole.

7. The rain coat according to claim 1, further comprising a pair of sleeves for accommodating the arms of said rider.

8. A rain coat to be worn by a rider of a horse equipped with a saddle, stirrups and reins, said rain coat comprising:

a weatherproof cloak for wrapping about the body of said individual, said cloak including (a) a top edge for encircling the neck of said rider;

(b) a bottom edge for hanging slightly above the feet of said rider when said rider is standing dismounted from said horse and extending entirely around the rear of said horse at a height approximately halfway down said horse's buttocks when said rider is seated on said horse;

(c) a pair of opposed front edges, each front edge including an upper portion parallel to the upper portion of the other front edge and a lower portion diverging from the lower portion of the other front edge; and (d) first fastening means for detachably securing the upper portions of said front edges to one another across the chest of said rider; and (e) second fastening means for detachably securing the lower portions of said front edges to one another across the throat of said horse;

whereby the diverging lower portions of said opposed front edges define a vent extending along both sides of the neck of said horse and terminating slightly above the pommel of said saddle to allow said rider to easily grasp said reins when said individual is seated on said horse.

9. The rain coat according to claim 8, further comprising a weatherproof hood secured to said top edge of said cloak for covering the head of said rider, said hood including:

(a) a bonnet contoured and dimensioned to fit over a wide-brimmed hat; and (b) adjustment means for tightening said bonnet about said rider's face.

10. The rain coat according to claim 8, wherein said adjustment means comprises a drawstring.

11. The rain coat according to claim 8, further comprising:

(a) at least one breather hole formed in said cloak for allowing air to circulate in and out of said cloak; and (b) flap means overlying said breather hole for preventing water from entering through said breather hole.

12. The rain coat according to claim 8, further comprising a pair of sleeves for accommodating the arms of said rider.

13. The rain coat according to claim 8, further comprising:

(a) a hem formed along the bottom edge of said cloak; and (b) means encased within said hem for weighting the bottom edge of said cloak.

14. The rain coat according to claim 8, further comprising:

(a) open pocket means formed inside said cloak proximate the bottom edge thereof; and (b) means removably contained within said pocket means for weighting the bottom edge of said cloak.

* * * * *

UNITED STATES PATENT AND TRADEMARK OFFICE
CERTIFICATE OF CORRECTION

PATENT NO. : 5,056,160
DATED : 15 October 1991
INVENTOR(S) : Roger T. Buchanan

It is certified that error appears in the above–identified patent and that said Letters Patent is hereby corrected as shown below:

In Claim 1, line 1, delete "b" and insert --be--.

Signed and Sealed this

Twenty-third Day of February, 1993

Attest:

STEPHEN G. KUNIN

*Attesting Officer*         Acting Commissioner of Patents and Trademarks